ated or adjusted under 35
(12) United States Patent
Yokoi et al.

(10) Patent No.: US 10,281,163 B2
(45) Date of Patent: May 7, 2019

(54) ISOLATOR, CLEAN BENCH, AND CABINET

(71) Applicant: PHC HOLDINGS CORPORATION, Tokyo (JP)

(72) Inventors: Yasuhiko Yokoi, Hyogo (JP); Koichi Kobayashi, Tochigi (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 893 days.

(21) Appl. No.: 14/665,929

(22) Filed: Mar. 23, 2015

(65) Prior Publication Data

US 2015/0192313 A1    Jul. 9, 2015

Related U.S. Application Data

(63) Continuation of application No. PCT/JP2014/001723, filed on Mar. 25, 2014.

(30) Foreign Application Priority Data

Mar. 29, 2013   (JP) ................. 2013-071692

(51) Int. Cl.
  *F24F 3/16*     (2006.01)
  *B25J 21/02*    (2006.01)
  *B01L 1/04*     (2006.01)

(52) U.S. Cl.
  CPC .......... *F24F 3/161* (2013.01); *B01L 1/04* (2013.01); *B25J 21/02* (2013.01); *F24F 3/1607* (2013.01)

(58) Field of Classification Search
  USPC .................................. 454/56, 187
  See application file for complete search history.

(56) References Cited

U.S. PATENT DOCUMENTS 5,257,957 A * 11/1993 Diccianni ............... B25J 21/02
                                                         312/1
5,316,560 A * 5/1994 Krone-Schmidt .......................
                                                       B01D 46/0091
                                                           422/124

(Continued)

FOREIGN PATENT DOCUMENTS

JP      09-269399 A    10/1997
JP    2000-123111 A     4/2000

(Continued)

OTHER PUBLICATIONS

International Search Report issued in International Application No. PCT/JP2014/001723 dated Jul. 1, 2014.

*Primary Examiner* — Gregory L Huson
*Assistant Examiner* — Ryan L Faulkner
(74) *Attorney, Agent, or Firm* — McDermott Will & Emery LLP

(57) ABSTRACT

An isolator including: a main body case including a box-shaped working space and provided with an inserting portion of a work hand on a front surface thereof; an illuminating device that illuminates the inside of the main body case; and an air-conditioning device that performs air conditioning inside the main body case, the illuminating device having a plurality of point light sources that are arranged substantially linearly in the main body case, the main body case including a back plate or a bottom plate, at least one of the back plate or the bottom plate being constituted by a metal plate, and a rolling direction of the back plate or the bottom plate constituted by the metal plate being a direction substantially orthogonal to an arrangement direction of the plurality of point light sources.

15 Claims, 10 Drawing Sheets

(56) References Cited

U.S. PATENT DOCUMENTS

| | | | | |
|---|---|---|---|---|
| 5,697,838 A * | 12/1997 | Morris | B08B 15/023 | 454/61 |
| 5,711,705 A * | 1/1998 | Krainiak | A61L 2/208 | 454/57 |
| 5,882,254 A * | 3/1999 | Jacob | B08B 15/023 | 454/61 |
| 6,428,408 B1 * | 8/2002 | Bell | B01L 1/50 | 454/56 |
| 6,517,429 B1 * | 2/2003 | O'Connell | B08B 15/026 | 454/56 |
| 7,048,625 B2 * | 5/2006 | Anezaki | B08B 15/023 | 454/56 |
| 7,090,709 B2 * | 8/2006 | Ono | B01L 1/04 | 454/187 |
| 2001/0023172 A1 * | 9/2001 | Winkelman | A45D 29/00 | 454/56 |
| 2007/0184769 A1 * | 8/2007 | Lin | B08B 15/02 | 454/57 |
| 2008/0108290 A1 * | 5/2008 | Zeigler | B08B 15/023 | 454/56 |
| 2008/0278042 A1 * | 11/2008 | McCarthy | B01D 46/0091 | 312/209 |
| 2010/0060119 A1 | 3/2010 | Lecoutre | | |
| 2012/0092876 A1 * | 4/2012 | Chang | F21V 5/00 | 362/326 |
| 2012/0156978 A1 * | 6/2012 | Kuang | B25H 1/04 | 454/57 |

FOREIGN PATENT DOCUMENTS

| | | | |
|---|---|---|---|
| JP | 2000123111 | * | 4/2000 |
| JP | 2001-006430 A | | 1/2004 |
| JP | 2005-048971 A | | 2/2005 |
| JP | 2010-510508 A | | 4/2010 |

* cited by examiner

US 10,281,163 B2

ISOLATOR, CLEAN BENCH, AND CABINET

CROSS-REFERENCE TO RELATED APPLICATIONS

This is a continuation application of International Patent Application No. PCT/JP2014/001723 filed Mar. 25, 2014, which claims the benefit of priority to Japanese Patent Application No. 2013-71692 filed Mar. 29, 2013. The full contents of the International Patent Application are incorporated herein by reference.

BACKGROUND

Technical Field

The present disclosure relates to an isolator, a clean bench and a cabinet, which are used for experimental environment equipment.

Description of the Related Art

For example, Patent Literature 1 (Japanese Patent Application Laid-open Publication No. 2005-48971) discloses a clean bench that maintains the inside of a sectioned space in a clean environment. This clean bench includes a box-shaped main body case provided with an inserting portion of a work hand on a front surface thereof, an illuminating means that illuminates the inside of the main body case, and an air-conditioning means that performs air conditioning inside the main body case.

An isolator, a clean bench and a cabinet (hereinafter, referred to as "isolator and the like") are used when an operator performs work by inserting his/her hands into a main body case illuminated by an illuminating means. Furthermore, since it is necessary for the isolator and the like to keep the inside of the main body case thereof clean or sterile, a stainless steel plate or the like which is easy to be cleaned and disinfected is often used for the interior of the main body case.

However, in the above-stated isolator and the like, for example, the illuminating means is arranged on a back plate in the main body case, thereby light from the illuminating means which is reflected on a bottom plate to be a work platform in the main body case is viewed by the eyes of the operator, and this causes workability deterioration.

Thus, the present disclosure provides an isolator and the like improved in workability.

SUMMARY

An isolator according to an aspect of the present disclosure, includes: a main body case including a box-shaped working space and provided with an inserting portion of a work hand on a front surface thereof; an illuminating device that illuminates the inside of the main body case; and an air-conditioning device that performs air conditioning inside the main body case, the illuminating device having a plurality of point light sources arranged substantially linearly in the main body case, the main body case including a back plate or a bottom plate, at least one of the back plate or the bottom plate being constituted by a metal plate, a rolling direction of the back plate or the bottom plate which is constituted by the metal plate being a direction substantially orthogonal to an arrangement direction of the plurality of point light sources.

Other features of the present invention will become apparent from descriptions of the present specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION

At least the following details will become apparent from descriptions of the present specification and of the accompanying drawings.

Embodiments are described in detail below with reference to the attached drawings, appropriately. However, descriptions in detail more than necessary may be omitted. For example, matters which have been already well known may not be described in detail, and substantially the same configurations may not be described redundantly. This is for avoiding the following descriptions from being unnecessarily redundant and for allowing those skilled in the art to easily understand them.

Note that, the present inventor(s) gives the accompanying drawings and the following descriptions for allowing those skilled in the art to sufficiently understand the present disclosure, and the main theme defined in the claims is not intended to be restricted thereby.

Embodiment 1

Hereinafter, as an example of experimental environment equipment having an isolator and the like, an isolator system 100 will be described using FIGS. 1 to 8.

The isolator system 100 of the embodiment 1 is a device for performing work, such as cell culture, cell operation, cell observation and the like in a sterile environment. Note that, sterilization is assumed to represent bringing a state closer to an aseptic state by sterilizing microorganisms, cell, and the like.

Note that, in the present embodiment, the Z-axis is an axis along a perpendicular direction in which the isolator system 100 is provided to stand, a direction toward an upper side is referred to as the +Z direction, and a direction toward a lower side (downward) is referred to as the −Z direction. The Y-axis is an axis along a direction orthogonal to the front surface and the back surface of the isolator system 100, a direction from the front surface provided with an opening for performing work inside a working space, toward the back surface opposite to the front surface is referred to as the −Y direction, and a direction from the back surface to the front surface is referred to as the +Y direction. The X-axis is an axis along a direction orthogonal to the right and left side surfaces as viewed from the front surface, a direction from the left side surface toward the right side surface as viewed from the front surface is referred to as the +X direction, and a direction from the right side surface toward the left side surface is referred to as the −X direction.

[1-1. Configuration]

Figure 1:
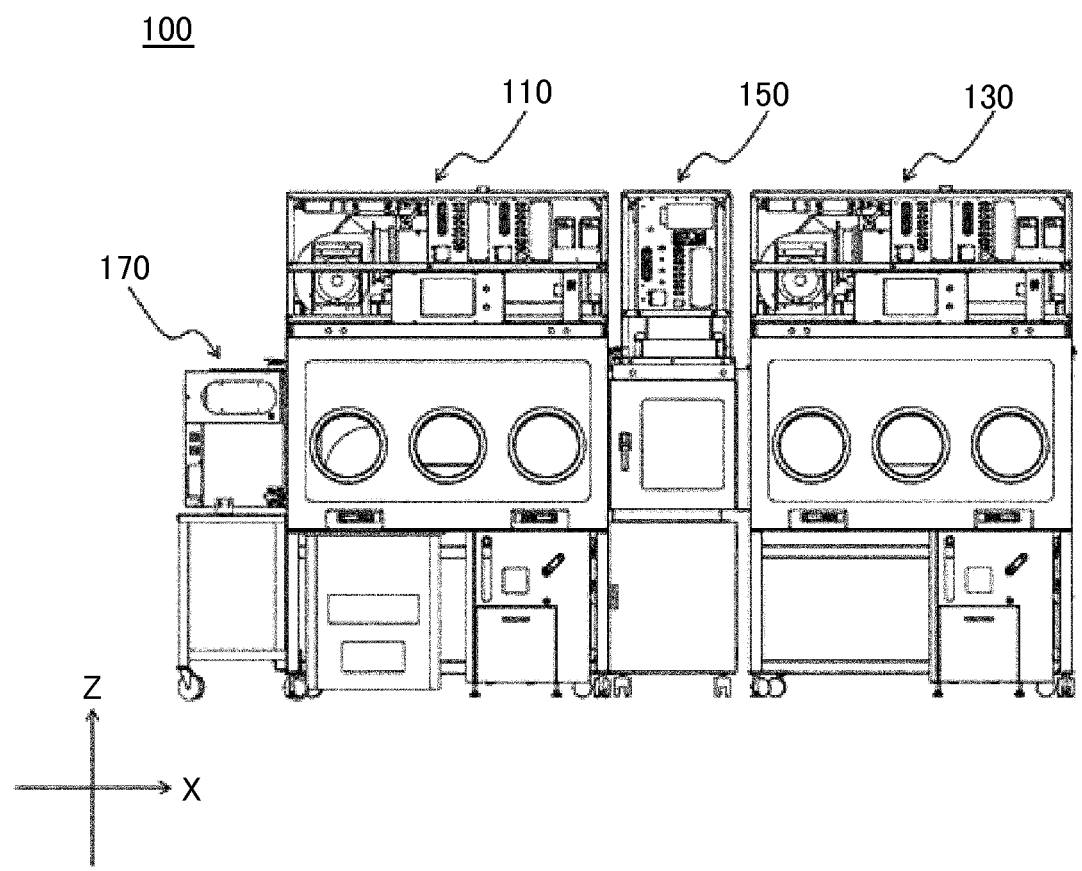
FIG. 1 is an exemplary front view of an isolator system in an embodiment 1.
Figure 2:
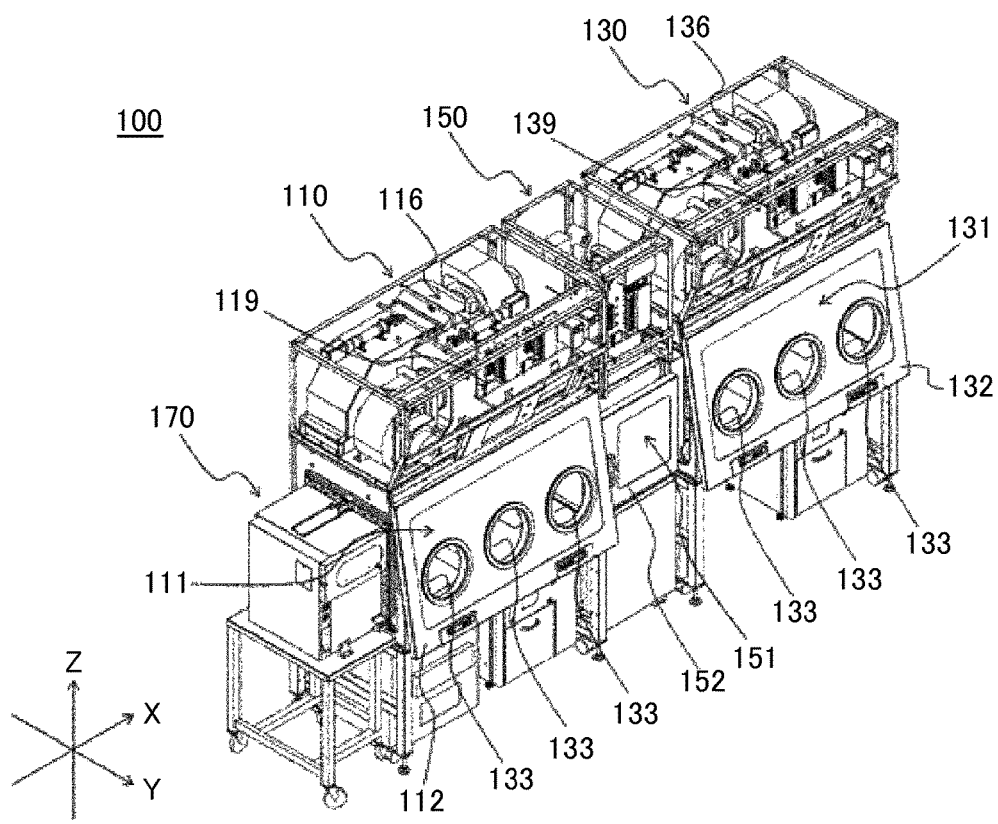
FIG. 2 is an exemplary perspective view of the isolator system in the embodiment 1.
Figure 3:
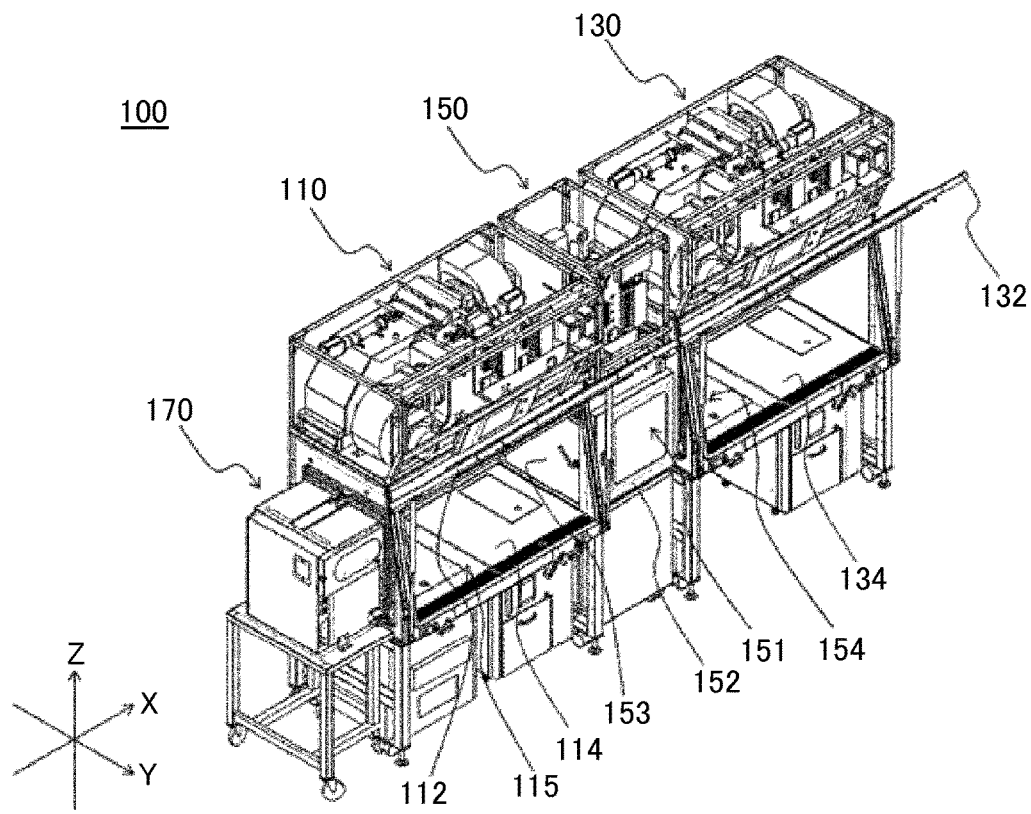
FIG. 3 is an exemplary perspective view of the isolator system in the embodiment 1.

FIG. 1 is a front view of the isolator system 100 in the embodiment 1. FIGS. 2 and 3 are perspective views of the isolator system 100 in the embodiment 1 and show an opening and closing state.

As shown in FIG. 1, the isolator system 100 of the embodiment 1 includes a first isolator 110, a second isolator 130, a pass box 150, and an incubator 170, and the respective devices are coupled in an airtight state.

As shown in FIG. 2, the first isolator 110 includes a main body case 111, an illuminating unit 120 (see FIGS. 7 and 8), an air-conditioning unit 116 (air-conditioning device), and a control unit 119.

The main body case 111 is configured with a front plate 112, a bottom plate 114 corresponding to a work platform, a back plate 117, a top plate 118, and right and left side plates 123, to include a box-shaped working space. The main body case 111 is sectioned as a space where bacterial invasion from the exterior is restrained, by, for example, a rectangular parallelepiped box. In the first isolator 110, the bottom plate 114, the back plate 117, the top plate 118, and the right and left side plates 123 are constituted by stainless steel plates which are easily cleaned and disinfected.

The front plate 112 is constituted by a glass plate, and a plurality of openings 113 which are inserting portions of the work hand is provided on the front surface thereof. A glove (not shown) is mounted on each of the plurality of openings 113. On the right and left side plates 123, openings are provided for mounting the pass box 150 or the incubator 170. In the first isolator 110, the pass box 150 is mounted on the opening of the right side plate 123a, and a door of a take-out port 153 of the pass box 150 constitutes a part of the right side surface. Furthermore, the incubator 170 is mounted on the opening of the left side plate 123b, and the door of the take-out port of the incubator 170 constitutes a part of the left side surface. At the time of working, the operator performs work inside the main body case 111 through the gloves. At the top plate 118, a hanging rod 122 (see FIG. 6) for hanging goods used in work is provided.

The illuminating unit 120 is provided in the main body case 111 for illuminating the inside of the main body case 111. In the isolator system 100, the illuminating unit 120 is arranged in a horizontal direction on the upper front side inside the first main body case 111. Details will be described later.

The air-conditioning unit 116 is provided at the upper portion of the main body case 111 to perform air conditioning in the main body case 111. The air-conditioning unit 116 includes a gas supply port (not shown) provided to the top plate 118 in the main body case 111, and a gas discharge port 115 provided on the front side and back side of the bottom plate 114. Air is supplied from the gas supply port into the main body case 111, and air is discharged from the gas discharge port 115. Generally, in the isolator, a filter such as an HEPA (High-Efficiency Particulate Air) filter is provided to the gas supply port to secure an aseptic environment in the main body case, and thus air is supplied into the main body case through the filter. Furthermore, a filter is also provided to the gas discharge port, and air in the working chamber is discharged from the main body case through the filter. Moreover, in the isolator, a sterilizing substance such as hydrogen peroxide is sprayed into the main body case to perform a sterilization treatment for sterilizing the inside of the main body case.

The control unit 119 is provided at the upper portion of the main body case 111 to control the air-conditioning unit 116, a temperature control unit, or the like.

The first isolator 110 includes other devices such as an observation device and a centrifuge which are necessary for experiments.

As shown in FIGS. 2 and 3, although the configuration of the second isolator 130 differs from that of the first isolator 110 due to differences of various kinds of devices to be mounted and positional differences thereof, the basic configuration is similar and thus descriptions thereof are omitted.

The pass box 150 is provided to allow the operator to bring a work object from the exterior into the interior of the first isolator 110 or the second isolator 130. In addition, the pass box 150 is provided to allow the operator to transfer the work object between the first isolator 110 and the second isolator 130. The pass box 150 includes a box-shaped delivery case 151 that includes a space in which the work object is temporarily stored. An insert port 152 is provided on the front face of the delivery case 151, and the exterior and the interior is separated by the door of the insert port 152. Furthermore, take-out ports 153, 154 are provided on the right and left side surfaces of the delivery case 151. The take-out port 153 is mounted on the side surface of the first isolator 110 to allow the pass box 150 and the first isolator 110 to be communicated with each other. Similarly, the take-out port 154 is mounted on the side surface of the second isolator 130 to allow the pass box 150 and the second isolator 130 to be communicated with each other. Each of the take-out ports 153, 154 has an openable/closable door installed thereto, and for example, the door of the take-out port 153 separates the space inside the delivery case 151 from the space inside the first main body case 111.

The incubator 170 includes a storage chamber (not shown) in the inside thereof. This storage chamber is a chamber for storing cultures, and is sectioned as a space in which bacterial invasion from the exterior is restrained by such as a rectangular parallelepiped box. In the present embodiment, the storage chamber is sectioned by a stainless steel plate. The incubator 170 is configured to be attachable/detachable to/from the first isolator 110. Thus, cultures can be controlled for each incubator 170. For example, problems such as mix-up of cultures can be restrained by using the incubator 170 exclusive for each donor.

[1-2. Characteristic Configuration of the Present Disclosure]

Figure 4:
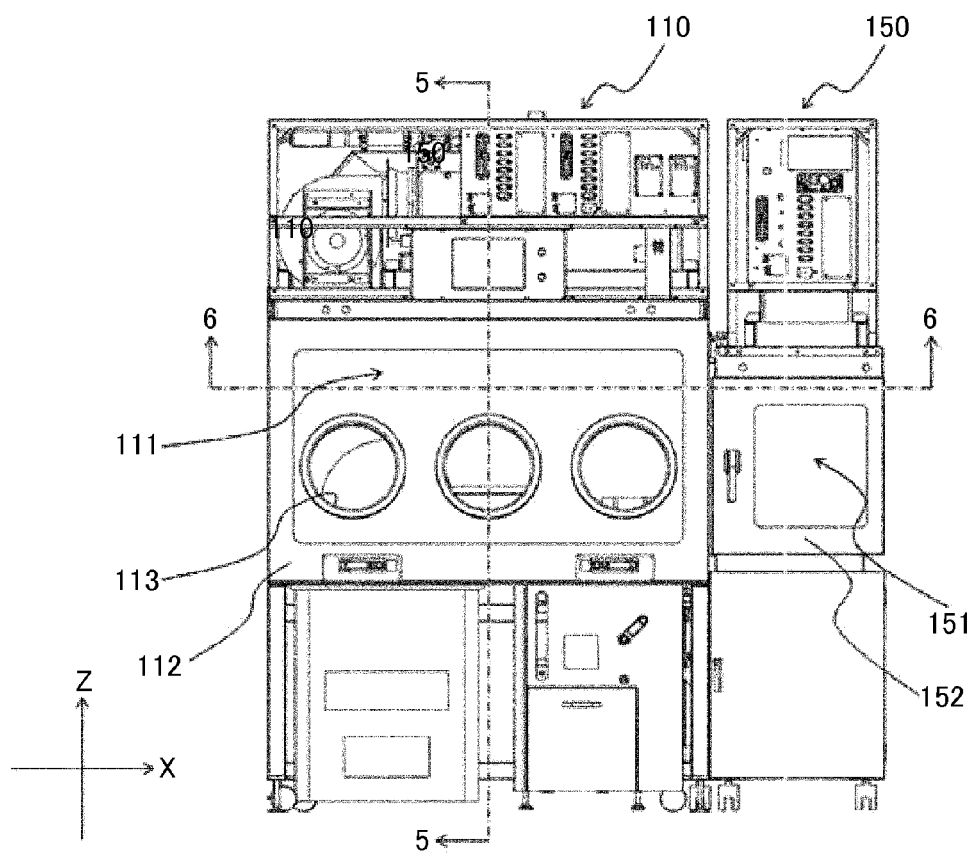
FIG. 4 is an exemplary front view of a first chamber unit and a pass box unit in the embodiment 1.
Figure 5:
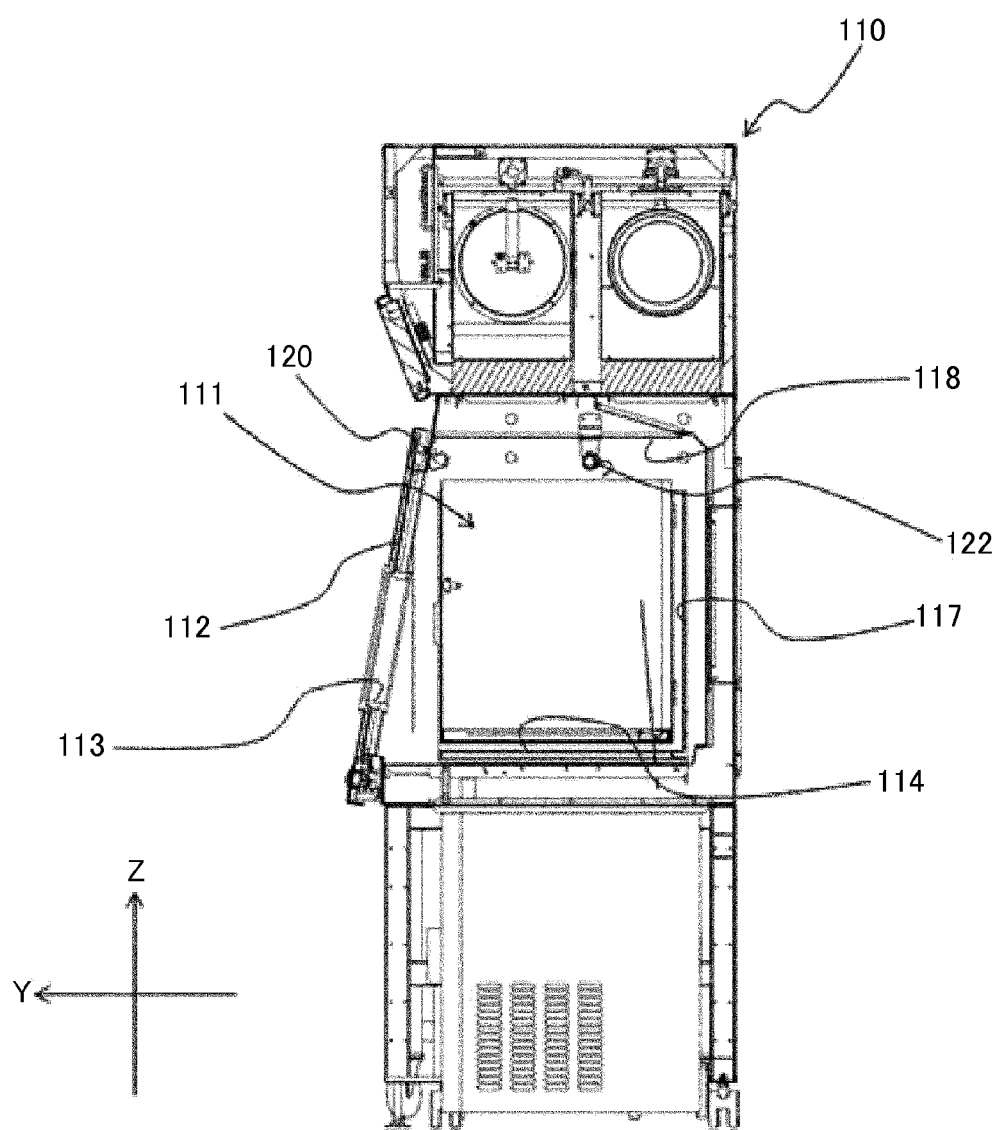
FIG. 5 is an exemplary cross-sectional view taken along line 5-5 of FIG. 4.
Figure 6:
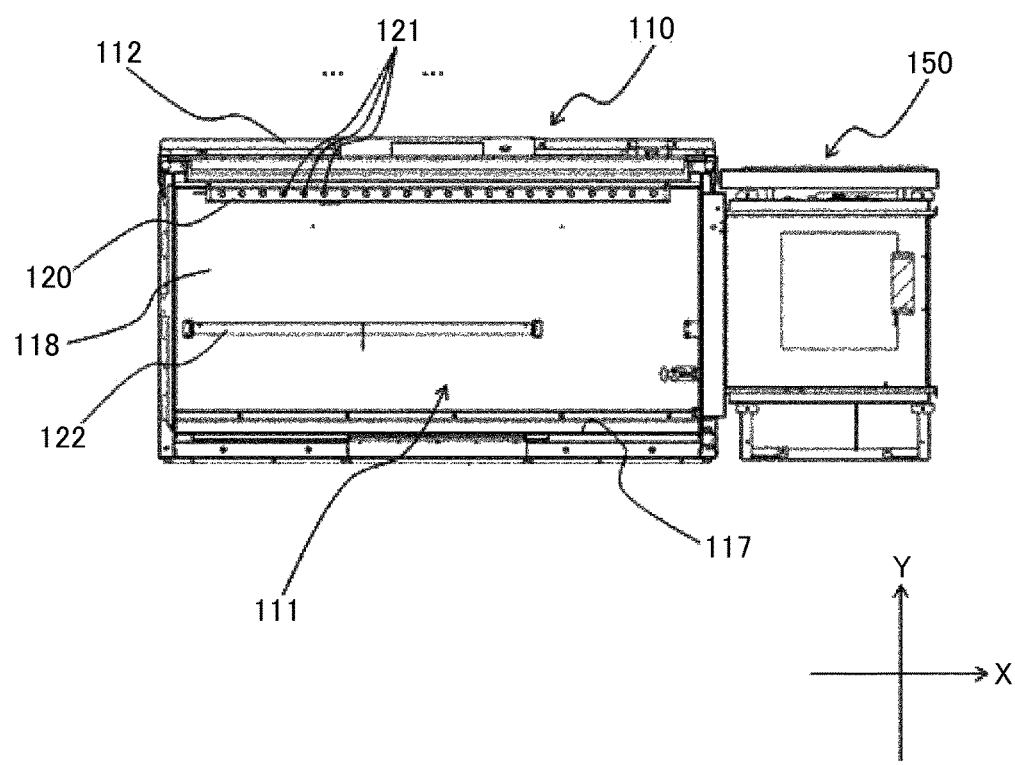
FIG. 6 is an exemplary cross-sectional view taken along 6-6 of FIG. 4.

FIG. 4 is a front view of the first isolator 110 and a pass box 150 in the embodiment 1. FIG. 5 is a cross-sectional view taken along line 5-5 of FIG. 4. FIG. 6 is a cross-sectional view taken along 6-6 of FIG. 4. Note that, here, for convenience of description, the characteristic configuration of the present disclosure is described by using the first isolator 110. However, this configuration is also applicable to the second isolator 130.

As shown in FIGS. 5 and 6, in the present embodiment, the illuminating unit 120 is provided at the upper front side inside the first main body case 111 to illuminate the inside of the first main body case 111, and light-emitting diodes (LEDs) are used as a light source. The illuminating unit 120 is configured with a plurality of LEDs 121 arranged in the horizontal direction, that is, parallel to the X-axis. The plurality of LEDs 121 is arranged at predetermined intervals in the horizontal direction. The plurality of LEDs 121 is provided so that the respective optical axes of the plurality of LEDs 121 are directed, for example, to substantially the center of the bottom plate 114. This configuration, for example, enable laser light emitted from the LEDs 121 to be surely irradiated with respect to work objects provided on the bottom plate 114. Note that, for example, the plurality of LEDs 121 may be provided so that the respective optical axes of the plurality of LEDs 121 are directed, for example, to the back plate 117. In this case, the reflected light of the plurality of LEDs 121, which is reflected on the back plate 117, is to be irradiated to the work object provided on the bottom plate 114. That is, in this case, even when the work object is provided on the lower side (−Z) of the operator's hands which are inserted into the first main body case 111 through the glove, it is possible to surely illuminate this work object.

Furthermore, in the present embodiment, the bottom plate 114, the back plate 117, the top plate 118 and the side plates 123 are constituted by stainless steel plates. The rolling directions of the bottom plate 114, the back plate 117 and the top plate 118 are directions orthogonal to the arrangement direction of the plurality of LEDs 121, that is, directions orthogonal to the X-axis. Specifically, the rolling directions of the bottom plate 114 and the top plate 118 are directions parallel to the Y-axis, and the rolling direction of the back plate 117 is a direction parallel to the Z-axis. Note that, the rolling direction is a length direction of the metal plate that is formed in a plate shape by being passed between a plurality of rollers, and also is a rotational direction of the rollers.

[1-3. Advantageous Effect and the Like]

Figure 7:
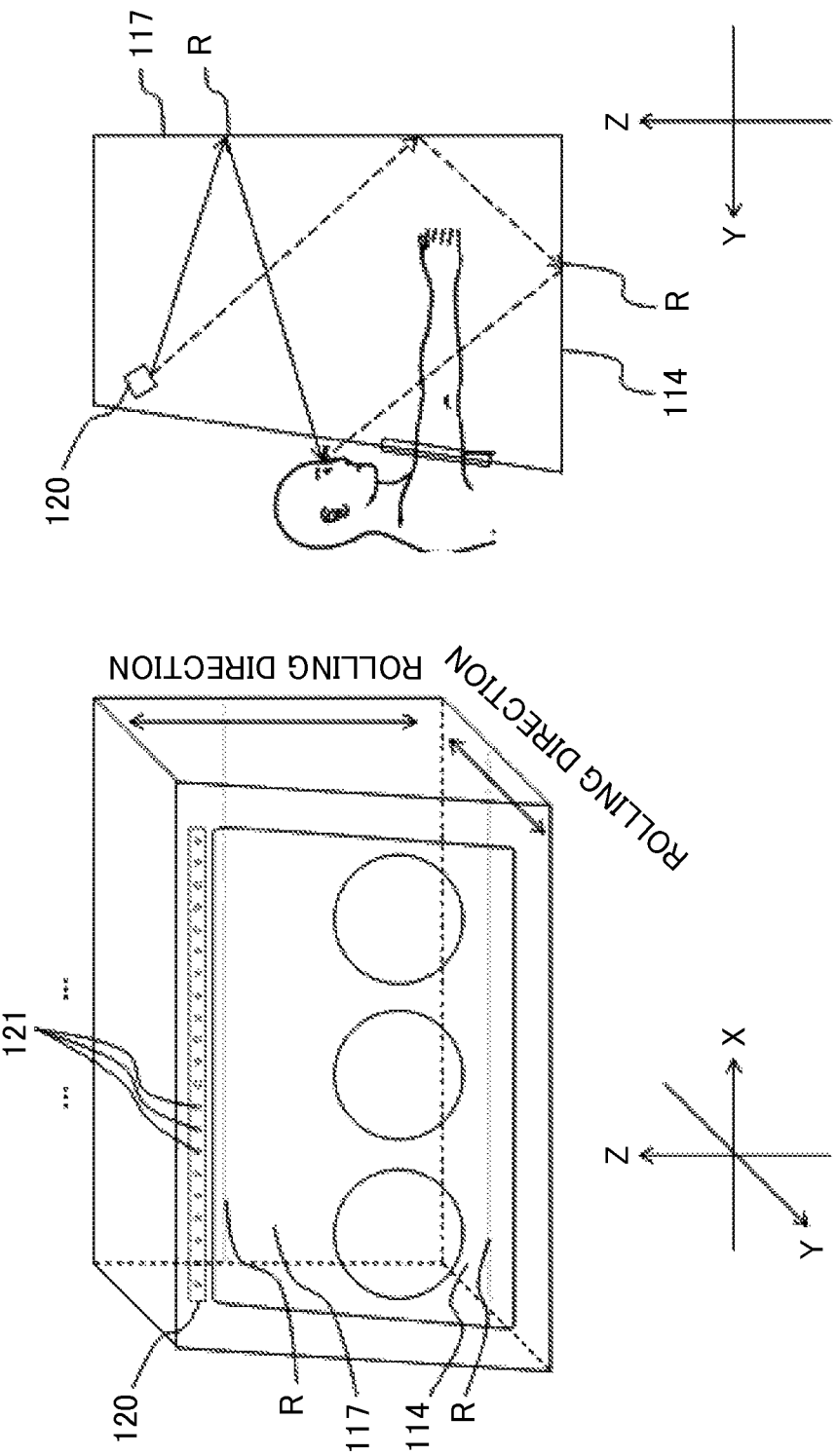
FIG. 7 is an exemplary diagram showing reflection by an illuminating unit in the embodiment 1.
Figure 8:
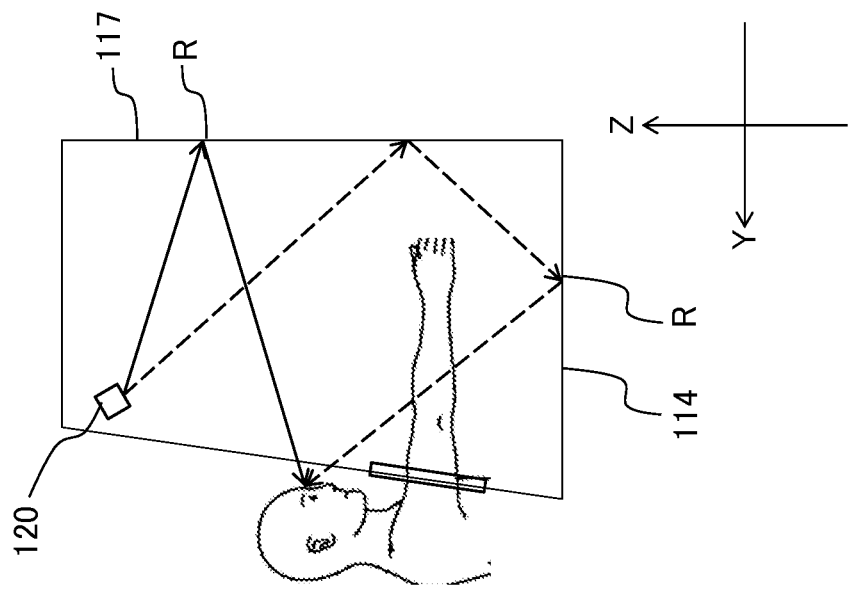
FIG. 8 is an exemplary diagram showing reflection by the illuminating unit in a comparative example.
Figure 8:
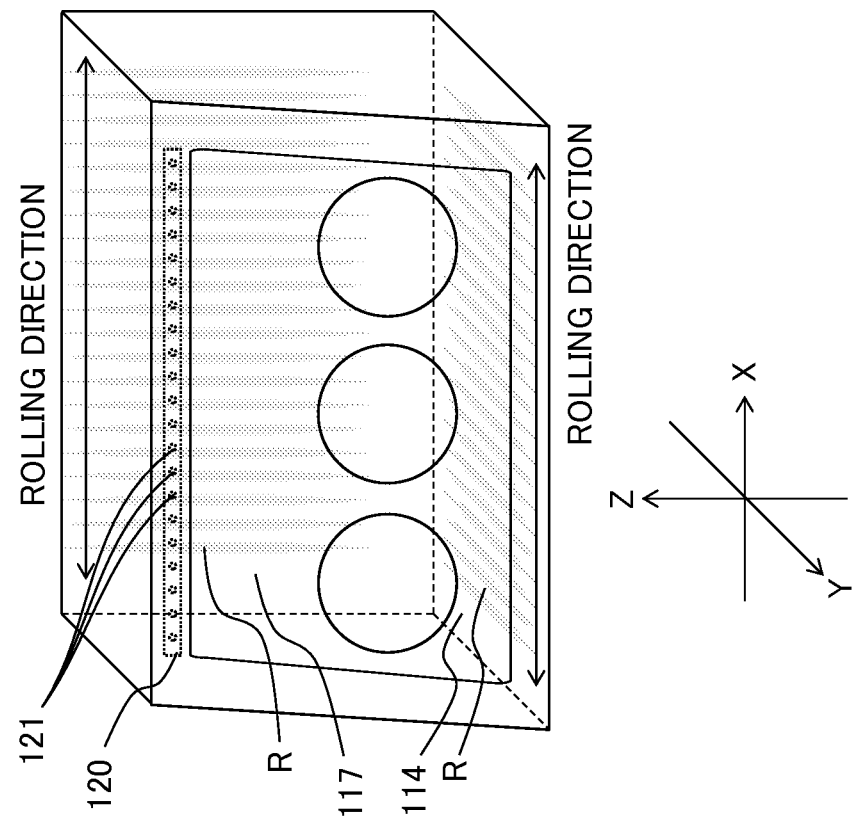

Advantageous effects of the above-mentioned characteristic configuration of the present disclosure will be described by using FIGS. 7 and 8. FIG. 7 is a diagram showing reflection R by the illuminating unit 120 in the embodiment 1, and FIG. 8 is a diagram showing reflection R by the illuminating unit 120 in a comparative example.

In the present embodiment, the first isolator 110 includes the box-shaped first main body case 111 which is provided with the opening 113 on the front surface thereof as the inserting portion of the work hand, the illuminating unit 120 that illuminates the inside of the first main body case 111, and the air-conditioning unit 116 that performs air conditioning inside the first main body case 111. The illuminating unit 120 has a plurality of LEDs 121 arranged substantially linearly in the first main body case 111, the back plate 117 and the bottom plate 114 in the first main body case 111 are constituted by stainless steel plates, and the rolling directions of the back plate 117 or the bottom plate 114 are directions orthogonal to the arrangement direction of the plurality of LEDs 121.

That is, in the first isolator 110 of the present disclosure, the plurality of LEDs 121 is arranged in a direction parallel to the X-axis, the rolling direction of the back plate 117 is a direction parallel to the Z-axis, and the rolling direction of the bottom plate 114 is a direction parallel to the Y-axis.

For this reason, when the operator visually sees the plurality of LEDs 121 reflected on the back plate 117 or the bottom plate 114, the reflection R of the plurality of LEDs 121 seems to be continuous in a line in the arrangement direction (direction parallel to the X-axis). For example, as shown in FIG. 7, the reflection R of the LEDs 121 in the case of visually seeing the LEDs 121 reflected on the back plate 117 becomes one line parallel to the X-axis at the upper portion of the back plate 117. Thus, the light of LEDs 121 reflected on the back plate 117 is restrained from being directly projected into the eyes of the operator. In this way, the first isolator 110 can restrain the light of the plurality of LEDs 121 reflected on the back plate 117 or the bottom plate 114. Therefore, the workability can be improved.

On the other hand, in a case where the arrangement direction of the plurality of LEDs 121 and the rolling direction of the back plate 117 or the bottom plate 114 are set parallel to each other, the plurality of LEDs 121 is reflected in a stripe state formed by multiple lines. For example, as shown in FIG. 8, the reflection R of the LEDs 121 when visually seeing the LEDs 121 reflected on the back plate 117 having such a configuration is seen from the upper portion to the lower portion of the back plate, that is, the multiple lines parallel to the Z-axis are reflected in a stripe state. Consequently, the light of the LED 121 is seen as if it is reflected on the front surface of the back plate 117, and thus the workability is significantly deteriorated.

In this way, the first isolator 110 of the present disclosure can prevent the light of the illuminating unit 120 from being directly projected into the eyes of the operator. Therefore, the workability can be improved.

Note that, although the first isolator 110 is described herein, the same effect can be obtained even when the same configuration is used for the second isolator 130.

Furthermore, since the reflected light of the LED 121 is easily reflected on the eyes of the operator from the back plate 117, in a case where the back plate 117 inside the first main body case 111 is constituted by metal plate, it is effective when the rolling direction of the back plate 117 is set substantially orthogonal to the arrangement direction of the plurality of LEDs 121. The same applies to the bottom plate 114.

Furthermore, it is effective to use LEDs for the plurality of light sources because of their long lifespan.

Moreover, in a case where the plurality of light sources is arranged at the upper front side inside the first main body case 111, it is effective because the inside of the entire first main body case 111 can be illuminated and the light does not easily come into the visual field of the operator.

Furthermore, in a case where the plurality of light sources is arranged at predetermined intervals in the horizontal direction, it is effective because the inside of the first main body case 111 can be illuminated more uniformly.

Other Embodiments

As stated above, the embodiment 1 has been described as an example of technique disclosed in the present application. However, the technique in the present disclosure is not limited thereto and is also applicable to embodiments to which changes, replacements, additions, omissions, and the like have been made appropriately. Furthermore, it is also possible to create a new embodiment by combining respective constituent elements described in the above-mentioned embodiment 1.

Thus, other embodiments will be collectively described below.

In the embodiment 1, the isolator system 100 has been described as an example of the experimental environment equipment having an isolator. When using the isolator system 100 as the experimental environment equipment having the isolator, the workability can be improved. However, the present disclosed technique is not limited thereto. For example, as experimental environment equipment having an isolator, the present disclosed technique may be used for an isolator system that is configured by the first isolator 110, the pass box 150 and the incubator 170 and does not have the second isolator 130.

<Cabinet for Biohazard Countermeasure>

Figure 9:
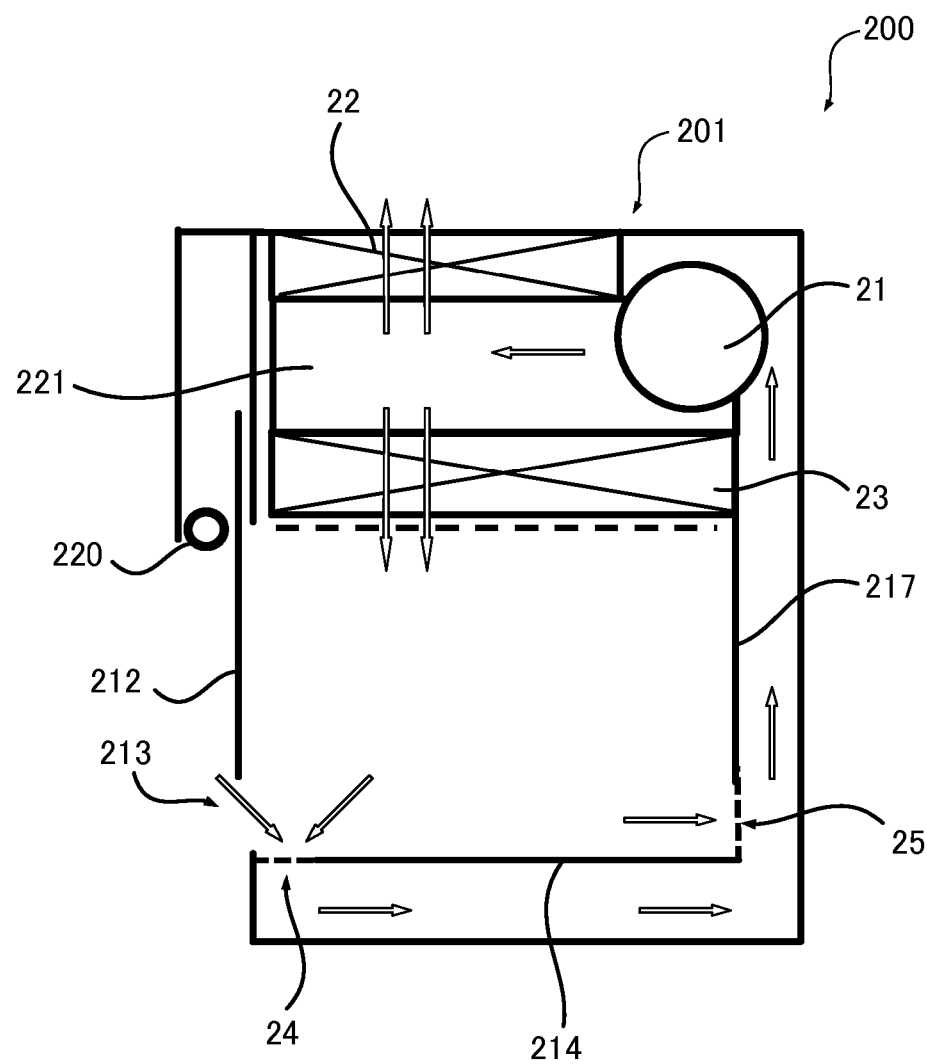
FIG. 9 is an exemplary cross-sectional view showing a cabinet for biohazard countermeasure in another embodiment.

Moreover, as an example of experimental environment equipment having a cabinet, the present disclosed technique may be used for a cabinet for biohazard countermeasure 200 (FIG. 9) that brings the inside of a main body case 201 into a negative pressure. FIG. 9 is a cross-sectional view showing the cabinet for biohazard countermeasure 200 in another embodiment.

The cabinet for biohazard countermeasure 200 (simply, also referred to as a "cabinet 200") includes a main body case 201, a front panel 212, a front opening portion 213, a work platform front intake port 24, a bottom plate 214, a back side suction port 25, a back plate 217, a circulation air filter 23, a blower 21, a discharge filter 22, a contamination plenum 221, and an illuminating unit 220 (illuminating device).

The main body case 201 is a box-shaped case having a front opening portion 213 on the front side (+Y) for allowing the operator's hands (work hands) to be inserted thereto.

The blower 21 generates an air current toward a direction shown by a hollow arrow of FIG. 9, and exerts a function as an air-conditioning device of the cabinet 200.

The illuminating unit 220 is an illuminating device having the same configuration as the illuminating unit 120 of the embodiment 1. In other words, the illuminating unit 220 has a plurality of LEDs (not shown) as a plurality of point light sources. The plurality of LEDs is arranged substantially linearly along the X-axis (horizontal direction) at the upper (+Z) front side (+Y) in the main body case 201. Furthermore, these plurality of LEDs are arranged at predetermined intervals in the horizontal direction.

The bottom plate 214 exerts a function as a work platform of the cabinet 200. Note that, the bottom plate 214 is a metallic plate member having the same configuration as the bottom plate 114 of the embodiment 1. In other words, the bottom plate 214 is provided so that the rolling direction of the bottom plate 214 becomes a direction (Y-axis) substantially orthogonal to the arrangement direction (X-axis) of the plurality of LEDs.

The back plate 217 is a metallic plate member having the same configuration as the back plate 117 of the embodiment 1. In other words, the back plate 217 is provided so that the rolling direction of the back plate 217 becomes a direction (Z-axis) substantially orthogonal to the arrangement direction (X-axis) of the plurality of LEDs.

Note that, for example, the bottom plate 214 and the back plate 217 may be provided in such a manner that the rolling direction of the bottom plate 214 becomes a direction substantially orthogonal to the arrangement direction of the LEDs, and the rolling direction of the back plate 217 becomes the arrangement direction of the LEDs. Moreover, for example, the bottom plate 214 and the back plate 217 may be provided in such a manner that the rolling direction of the bottom plate 214 becomes the arrangement direction of the LEDs, and the rolling direction of the back plate 217 becomes a direction substantially orthogonal to the arrangement direction of the LEDs.

<Clean Bench>

Figure 10:
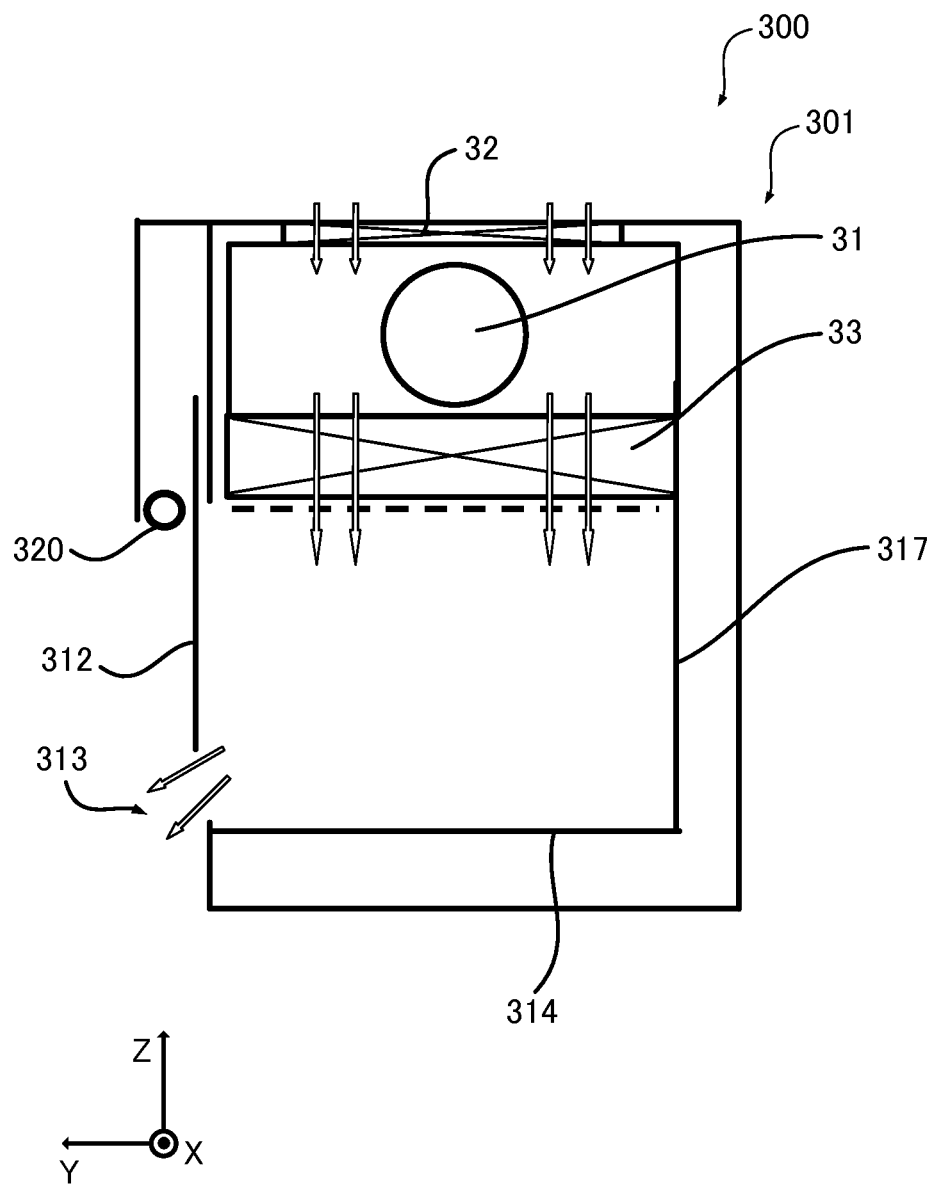
FIG. 10 is an exemplary cross-sectional view showing a clean bench in another embodiment.

As an example of the experimental environment equipment having a clean bench, a general clean bench 300 (FIG. 10) that has brought the inside of a main body case 301 into a positive pressure may be used. FIG. 10 is a cross-sectional view showing a clean bench 300 in another embodiment.

The clean bench 300 includes a main body case 301, a front panel 312, a front opening portion 313, a bottom plate 314, a back plate 317, a blower 31, a prefilter 32, a filter 33, and an illuminating unit 320 (illuminating device).

The main body case 301 is a box-shaped case having a front opening portion 313 on the front side (+Y) for allowing the operator's hands (work hands) to be inserted thereto. The blower 31 generates an air current toward a direction shown by a hollow arrow of FIG. 10, and exerts a function as an air-conditioning device of the clean bench 300.

The illuminating unit 320 is an illuminating device having the same configuration as the illuminating unit 120 of the embodiment 1. In other words, the illuminating unit 320 has a plurality of LEDs (not shown) as a plurality of point light sources. The plurality of LEDs is arranged substantially linearly along the X-axis (horizontal direction) at the upper (+Z) front side (+Y) in the main body case 301. Furthermore, these plurality of LEDs are arranged at predetermined intervals in the horizontal direction.

The bottom plate 314 exerts a function as a work platform of the clean bench 300. Note that, the bottom plate 314 is a metallic plate member having the same configuration as the bottom plate 114 of the embodiment 1. In other words, the bottom plate 314 is provided in such a manner that the rolling direction of the bottom plate 314 becomes a direction (Y-axis) substantially orthogonal to the arrangement direction (X-axis) of the plurality of LEDs.

The back plate 317 is a metallic plate member having the same configuration as the back plate 117 of the embodiment 1. In other words, the back plate 317 is provided in such a manner that the rolling direction of the back plate 317 becomes a direction (Z-axis) substantially orthogonal to the arrangement direction (X-axis) of the plurality of LEDs.

Note that, for example, the bottom plate 314 and the back plate 317 may be provided in such a manner that the rolling direction of the bottom plate 314 becomes a direction substantially orthogonal to the arrangement direction of the LEDs, and the rolling direction of the back plate 317 becomes the arrangement direction of the LEDs. Moreover, for example, the bottom plate 314 and the back plate 317 may be provided in such a manner that the rolling direction of the bottom plate 314 becomes the arrangement direction of the LEDs, and the rolling direction of the back plate 317 becomes a direction substantially orthogonal to the arrangement direction of the LEDs.

In short, the present disclosed technique is effective when used for an experimental environment apparatus in which the work hands are inserted into the box-shaped main body case and work is performed inside the main body case.

In the embodiment 1, a stainless steel plate is used as an example of the metal plate that constitutes the inside of the first main body case 111. When the stainless steel plate is used as the metal plate, it is effective because sterilization and disinfection can be easily performed. However, the technique of the present disclosure is not limited thereto. For example, an aluminum metal plate, a steel plate, or the like may be used as the metal plate. In short, the present disclosed technique is effective when the metal plate formed by the rolling process is used.

In the embodiment 1, as an example of the rolling direction of the metal plate that constitutes the inside of the first main body case 111, the rolling directions of the back plate 117 and the bottom plate 114 are arranged in a direction orthogonal to the arrangement direction of the plurality of LEDs 121. Since the back plate 117 and the bottom plate 114 are places that are easily viewed by the eyes of the operator at the time of working, in the case that both rolling directions of the back plate 117 and the bottom plate 114 are configured to be directions orthogonal to the arrangement direction of the plurality of LEDs 121, it is effective to improve the workability. However, the technique of the present disclosure is not limited thereto. For example, it is effective even when the rolling direction of only the back plate 117 or only the bottom plate 114 is configured to be a direction orthogonal to the arrangement direction of the plurality of LEDs 121. Furthermore, it is effective even when this configuration is used for the side plates 123 or the top plate 118.

In the embodiment 1, a plurality of LEDs 121 has been described as an example of the illuminating device. When using the LEDs 121 as the plurality of light sources, it is effective because the LED has a long lifespan. However, a plurality of light sources is not limited thereto. For example, a plurality of electric bulbs, fluorescent lamps or the like may be arranged as a light source. When using the electric bulb, the fluorescent lamp or the like as an illuminating device, effects such as a cost reduction can be obtained. In short, the present disclosed technique is effective in a case where the plurality of light sources is arranged substantially linearly as the illuminating device.

In the embodiment 1, the plurality of LEDs 121 is arranged in the horizontal direction (direction parallel to the X axis) at the upper front side inside the first main body case 111 as an example of the illuminating device. With this configuration, it is effective because the inside of the entire first main body case 111 can be illuminated and the light does not easily come into the visual field of the operator. However, the arrangement position of the plurality of light sources is not limited to the upper front side inside the first main body case 111. For example, the plurality of light sources may be arranged on the right and left front sides in the substantially vertical direction (direction substantially parallel to the Z-axis) respectively. In such a case, the rolling direction of the back plate 117 is configured to be the horizontal direction (direction parallel to the X-axis), thereby the workability can be improved. Here, when the illuminating device is provided at the front side, it is effective because the light is restrained from being directly projected into the eyes of the operator.

Furthermore, in a case where the plurality of light sources is arranged at predetermined intervals in the horizontal direction, it is effective because the inside of the first main body case 111 can be illuminated more uniformly.

As stated above, the embodiments have been described as an example of the technique according to the present disclosure. For this purpose, the accompanying drawings and the detailed description have been provided.

Thus, the constituent elements described in the accompanying drawings and the detailed description may include not only the constituent elements necessary for overcoming the problems but also constituent elements unnecessary for overcoming the problems in order to exemplify the above techniques. Therefore, such unnecessary constituent elements should not be immediately determined to be necessary, for the reason that these unnecessary constituent elements are described in the accompanying drawings and the detailed description.

Furthermore, the above embodiments are merely for exemplifying the techniques according to present disclosure, and therefore, various changes, replacements, additions, omissions and the like can be made thereto within the scope of the claims and scopes equivalent thereto.

The present disclosure is applicable to a clean bench and an isolator where work is performed by inserting the work hand into the box-shaped experimental environment.

What is claimed is:

1. An isolator, comprising:
a main body case including a box-shaped working space and provided with an inserting portion of a work hand on a front surface thereof;
an illuminating device that illuminates the inside of the main body case; and
an air-conditioning device that performs air conditioning inside the main body case,
the illuminating device having a plurality of point light sources arranged substantially linearly in the main body case,
the main body case including a back plate or a bottom plate, at least one of the back plate or the bottom plate being constituted by a metal plate,
a rolling direction of the back plate or the bottom plate which is constituted by the metal plate being a direction substantially orthogonal to an arrangement direction of the plurality of point light sources.

2. The isolator according to claim 1, wherein the back plate inside the main body case is constituted by a metal plate.

3. The isolator according to claim 1, wherein the plurality of point light sources is LED lighting.

4. The isolator according to claim 1, wherein the plurality of point light sources is arranged on the upper front side inside the main body case.

5. The isolator according to claim 1, wherein the plurality of point light sources is arranged at predetermined intervals in a horizontal direction.

6. A clean bench, comprising:
a main body case including a box-shaped working space and provided with an inserting portion of a work hand on a front surface thereof;
an illuminating device that illuminates the inside of the main body case; and
an air-conditioning device that performs air conditioning inside the main body case,
the illuminating device having a plurality of point light sources arranged substantially linearly in the main body case,
the main body case including a back plate or a bottom plate, at least one of the back plate or the bottom plate being constituted by a metal plate,
a rolling direction of the back plate or the bottom plate which is constituted by the metal plate being a direction substantially orthogonal to an arrangement direction of the plurality of point light sources.

7. The clean bench according to claim 6, wherein the back plate inside the main body case is constituted by a metal plate.

8. The clean bench according to claim 6, wherein the plurality of point light sources is LED lighting.

9. The clean bench according to claim 6, wherein the plurality of point light sources is arranged on the upper front side inside the main body case.

10. The clean bench according to claim 6, wherein the plurality of point light sources is arranged at predetermined intervals in a horizontal direction.

11. A cabinet, comprising:
a main body case including a box-shaped working space and provided with an inserting portion of a work hand on a front surface thereof;
an illuminating device that illuminates the inside of the main body case; and
an air-conditioning device that performs air conditioning inside the main body case, the illuminating device having a plurality of point light sources arranged substantially linearly in the main body case, the main body case including a back plate or a bottom plate, at least one of the back plate or the bottom plate being constituted by a metal plate, a rolling direction of the back plate or the bottom plate which is constituted by the metal plate being a direction substantially orthogonal to an arrangement direction of the plurality of point light sources.

12. The cabinet according to claim 11, wherein the back plate inside the main body case is constituted by a metal plate.

13. The cabinet according to claim 11, wherein the plurality of point light sources is LED lighting.

14. The cabinet according to claim 11, wherein the plurality of point light sources is arranged on the upper front side inside the main body case.

15. The cabinet according to claim 11, wherein the plurality of point light sources is arranged at predetermined intervals in a horizontal direction.

* * * * *